Figure 1:
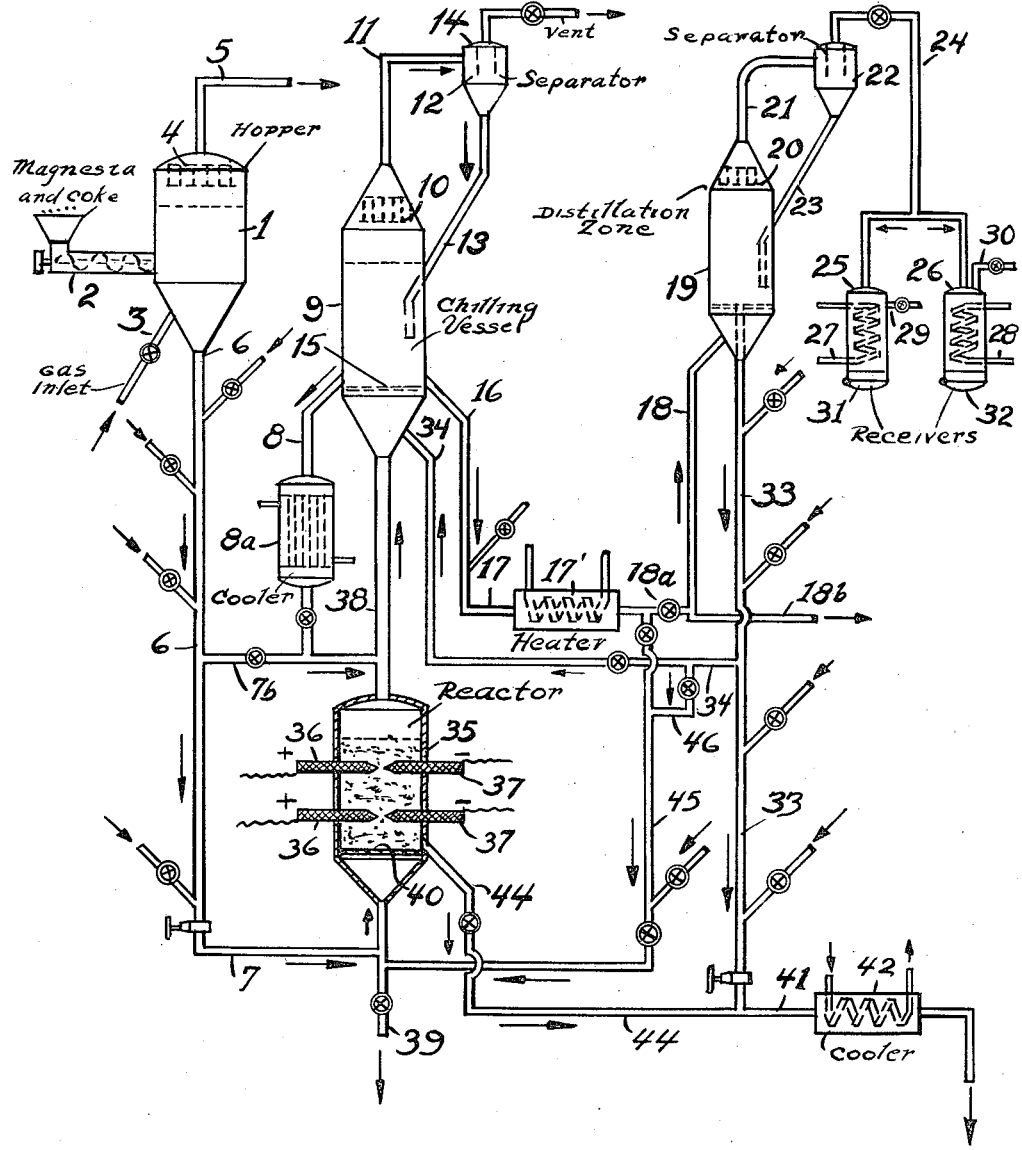

April 16, 1946.   J. C. MUNDAY   2,398,443
PRODUCTION OF METALS
Filed July 10, 1943   2 Sheets-Sheet 2
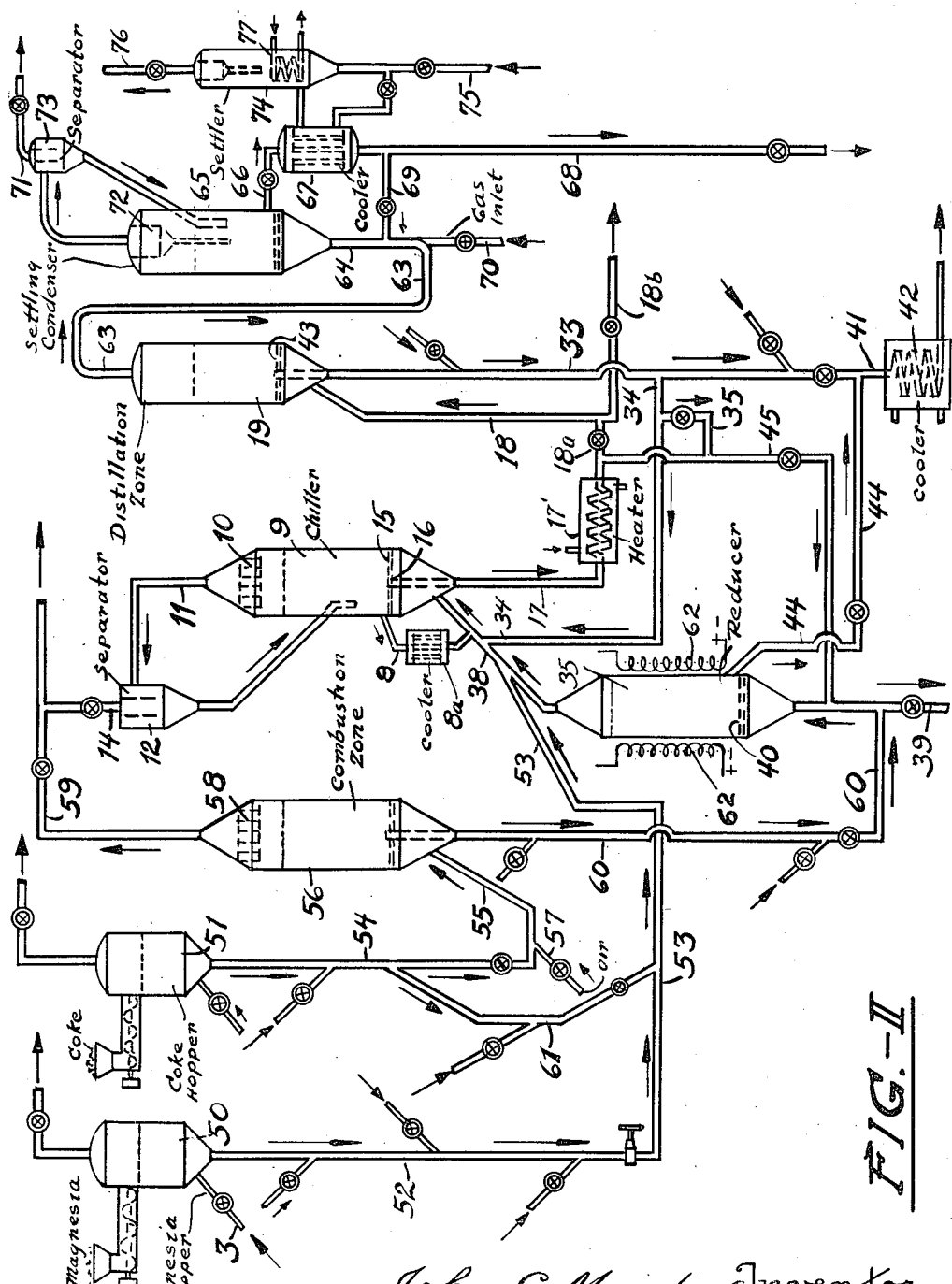
FIG.-II
John C. Munday Inventor
By C. F. Young Attorney Patented Apr. 16, 1946

2,398,443

UNITED STATES PATENT OFFICE 2,398,443

PRODUCTION OF METALS

John C. Munday, Cranford, N. J., assignor to Standard Oil Development Company, a corporation of Delaware Application July 10, 1943, Serial No. 494,182

9 Claims. (Cl. 75—26)

The present invention relates to the art of producing magnesium and other similar metals from their oxides, hydroxides and carbonate ores by reduction, and more specifically, to an improved method of conducting these reactions in a continuous, thoroughly efficient manner.

The drawing in Fig. 1 is a semi-diagrammatic view in sectional elevation of an apparatus for accomplishing the reduction of magnesia, and indicates the flow of materials through the apparatus; and Fig. 2 shows a modification of the process.

It is well known that oxides, hydroxides and carbonates of magnesium and other metals of the same class such as beryllium, cadmium, aluminum, zinc and mercury, can be readily reduced to the metallic state by the action of solid carbon at high temperatures, but the methods now in use are not particularly efficient and are generally conducted in batch. The temperature required is extremely high in some cases of the order of 2200° C., and the reaction which involves the concomitant production of carbon monoxide is readily reversible.

One object of the present invention is to devise an efficient method for carrying out the reduction of such ores by means of carbon and other reductants continuously and efficiently. Other objects will be apparent to those skilled in the art.

The invention will be described with particular reference to the production of magnesium from magnesia and carbon, but it is not limited to these reactants. Referring to the drawing, in Fig. 1 numeral 1 denotes a feed hopper into which a mixture of magnesia and coke is fed by the screw 2. It is preferred to supply this material in finely divided condition, finer than 50 mesh, say 100 to 200 mesh, but even larger lumps can be used if desired. Hopper 1 is fitted with a closed top and gas is fed into the bottom by pipe 3. The gas decreases the density of the solids by aeration, and they become capable of flowing much like liquids through pipes, valves and other fittings and show both dynamic and static heads. In this condition the solids are said to be "fluidized" or to be in "fluidized condition." Gas is vented at 5, but it passes through the dust separator 4 so that the solid content is retained in the hopper.

The fluidized solids are thoroughly admixed and are fed down through the standpipe 6 and by way of pipe 7 into a reactor 35 which is strongly heated, for example by arcs between electrodes 36 and 37, in order to effect the reduction of magnesia by carbon. The product vapors containing magnesium and carbon monoxide are passed from reactor 35 through pipe 38 into a chilling vessel 9. The vessel is called a chilling vessel although its temperature may be from say 300 to 500° C. because the hot stream of products is chilled rapidly therein, in order to prevent reversal of the reduction reaction. This will be described in detail below. The vessel 9 contains a fluidized mixture of carbon and magnesia introduced from hopper 1 through pipes 6, 7b and 38, and magnesium, which is condensed by the cooling into small particles. The bulk of the gas is drawn off from the vessel 9 by a pipe 11 by way of the dust separator 10 and it is desirable to provide a secondary separator 12 so that all of the valuable magnesium is recovered from the exit gas taken off at 14. The recovered solid is returned to the vessel 9 by the pipe 13 and the gas may be used for fluidizing purposes or for fuel, as required. The temperature in chiller 9 is maintained as desired by circulating fluidized solids from the chiller through pipe 8, heat exchanger 8a, pipes 7b and 38, thence back into the chiller.

From vessel 9 a fluidized stream of solids is taken off by pipe 16, and after passing through the heater 17' is conducted by the pipes 17 and 18 to a distillation chamber 19 which is maintained at a pressure considerably below atmospheric and is at a point elevated above the vessel 9. Gas such as hydrogen or methane may be added at 18b. The vapor passes through the separators 20 and 22 and through the vapor pipes 21 and 24 into one or the other of the twin receivers 25 and 26 which are cooled by coils 27 and 28, respectively. The receivers are used alternately and are fitted with removable bottoms 31 and 32 for the removal of magnesium. The evacuation pipes 29 and 30 are connected, of course, to the vacuum still which is not shown. The distillation zone 19, like the reducer 35, may be heated directly electrically, if desired.

In the distillation zone magnesium is removed as a vapor, leaving as a residue a mixture of carbon and magnesia. The dust separated in the separators 20 and 22 also consists of magnesia and carbon, and these materials are returned to the vessel 19. These solid residues are in a fluidized state, and as such may be drawn off from the vessel 19 by a pipe 33 and thence returned by 34 to the chiller 9. A portion of the fluidized material withdrawn from 19 through pipe 33 may be drawn off from the system by a pipe 41 and through the cooler 42 in order to prevent build-up of non-reducible impurities such as silica, and of excessive amounts of fine or coarse particles outside the desired particle size range. It is also desirable for reactor 35 to have an outlet pipe 44 for the same reason.

In a modification, the magnesia-coke mixture from hopper 1 may be introduced first to chiller 9, rather than directly to reactor 35, by way of pipes 6, 7b and 38, and then passed through pipes 16, 17 and 45 to reactor 35. In this manner the feed materials are used as chilling agents and at the same time are preheated for subsequent use. Alternately, the feed materials are first passed from chiller 9 to distillation zone 19 for removal of magnesium, and are then passed through pipes 33, 34, 46 and 45 to reactor 35.

The reduction zone 35 is maintained at a temperature of about 2000° or 2200° C. or somewhat higher in order to effect the reaction between the magnesium oxide and carbon so as to produce magnesium vapor and carbon monoxide. Being vapors, these materials pass rapidly from the reduction zone into the chiller 9 where the reaction products are rapidly reduced in temperature so as to prevent a reversal of the reduction reaction and consequent loss of magnesium. The chiller is ordinarily held at 300° to 500° C. so that the magnesium is condensed and preferably solidified either in small particles or on the surface of the solid materials present. The chilling is rapid and thorough so that little or none of the magnesium once produced is lost by the reversal of the reaction and before reheating the bulk of the CO is separated from the magnesium.

The use of fluidized solids for chilling has important advantages from both economic and safety standpoints. When gas is used for chilling, as in the prior art, as much as twenty-five volumes per volume of product gases are required, which in turn requires large heat exchangers and dust separators. Furthermore, even a momentary stoppage of the supply of chilling gas allows reversal of the reaction, forming solids from gases, and causing a sharp reduction in pressure which is liable to draw air into the system with consequent danger of explosion. On the other hand, fluidized solids have high heat capacity and the large amount maintained in the chiller acts as a reservoir for heat absorption, so that adequate chilling and perfect safety may be had for hours without any external cooling whatsoever.

The magnesium content is now separated from the involatile solids by distillation in the vessel 19. Its temperature is maintained from about 750° to 950° C., depending on the pressure which is maintained, but little CO is now present and the reaction is not reversed to any serious degree. The important consideration is that the fluidized streams permit flow smoothly and continuously from the chiller to the distillation vessel 19 and thence from 19 to the reducing vessel 35 or to the chiller 9.

In the above manner the process is made fully continuous and magnesium is produced rapidly and is then withdrawn and conserved.

In the above mentioned system the solid materials are maintained in a fluidized state throughout. The solids in reactor 35 are fluidized by the CO and Mg vapors formed in the reaction. However, in order that the solids be fluidized over the whole cross section it is preferable to introduce additional fluidizing gas, for example hydrogen, through pipe 39 beneath distribution grid 40. Similarly, distribution grids 15 and 43 may be employed in chiller 9 and distillation chamber 19, respectively, and gas may be introduced wherever required to maintain fluidity.

It is a simple matter to effect the fluidization of the solid materials simply by blowing them with a suitable gas. To be capable of flow the solids must contain from, say .01 to .07 cubic feet of gas per pound of the finely divided solid depending on the density and size range of the particles. Stated in another way, in order to maintain the fluidized condition, the relative superficial upward velocity of the fluidizing gas through the solids should be of the order of 0.02 to 0.1 feet per second, where fine powders are employed, and higher when larger lumps are used, say 10 to 20 feet per second for lumps of ¼ to ½″.

The density of fluidized solids is high, as compared to that of an ordinary suspension of solid in gas, and may be as much as 80% of the free settled density. In the reducer 35, the chiller 9 and the distillation zone 19 it is preferred to employ gas rates low enough to permit the solids to settle, yet high enough to cause agitation. Zones operated in this manner are termed "hindered settlers" and the temperatures therein are quite constant even when conducting highly endothermic or exothermic reactions, or when hot or cold streams are continuously added and withdrawn, as in the present process. Where fine powders are employed, the upward gas velocity in hindered settlers is generally less than 5 feet per second, preferably less than 2 feet per second, and in case very low entrainment is desired, as from distillation zone 19, less than 1 foot per second.

It has been found that when an amount of gas over and above that required for fluidizing is added to a fluidized mixture, the only important result is the reduction of the density of the fluidized solids and this fact is taken advantage of to effect the flow of fluidized streams through the equipment. In further explanation, it should be noted that the density of the stream in the pipe 16 is considerably greater than in the opposite pipe 18 because of the gas added at 18b and also because of the fact that the pressure in 19 is lower than that in 9. The flow can be readily controlled by a valve 18a in the pipe 17. As another example, the density of the stream flowing in the pipe 33 is greater than that in 18 and also greater than the average density in reactor 35 and in the pipe 38. Thus the flow is effected without the use of blowers or fans operating on the solid streams and merely by the addition or separation of gas from the suspensions, and the entire apparatus must be designed with the densities of the suspensions and their flow in mind.

It will be obvious that the rate of flow of the materials to the several zones, and the amount, the density and the level of the solids therein, can be controlled and kept in balance by manipulation of the valves and of the quantity of fluidizing gas employed in the various parts of the system. The system is preferably operated on magnesium ores rich in magnesium oxide, hydroxide or carbonate, but even dolomites containing calcium oxides may be used and a portion of the circulated material would then be drawn off continuously or at intervals in order to prevent the building up of calcium oxide and other inert materials in the system.

The apparatus illustrated in Fig. 2 is in many respects quite similar to that already described and need not be so completely detailed. In the apparatus of this drawing, separate feed hoppers 50 and 51 are supplied for the separate feeding of fluidized streams of magnesia and coke. The magnesia is fed through the pipes 52 and 53 directly into the chiller 9 while the coke stream passes through pipes 54 and 55 to a combustion zone 56. Air is also added to this zone by a pipe 57, and by burning a part of the coke in the zone, the remainder is heated to a high temperature. The combustion gas is passed through dust separator 58 and is taken off by the pipe 59, while the remainder of the highly heated coke is fed to the reduction vessel 35 by means of the pipe 60. A part of the carbon may be fed directly from the hopper 51 through pipe 61 and thence to the chiller 9 along with the magnesia if desired.

The reducer 35 in Fig. 2 is similar to that shown in Fig. 1, except that it is shown as heated by resistance or induction coils 62 instead of by electrodes.

The remainder of the apparatus is practically identical with that shown in Fig. 1, with the exception of the magnesium recovery system, and has been similarly numbered. The operation of the apparatus shown in Fig. 2 is also similar to that shown in Fig. 1 and needs no detailed description. By supplying a combustion zone, it is possible to furnish a part, at least, of the heat required for the conversion cheaply by means of the combustion of the coke, whereas in Fig. 1, it is supplied exclusively by electrical means.

With regard to the method of recovering magnesium illustrated in Fig. 2, the flow rate of the magnesium vapor passing overhead from zone 19 is maintained very low so that little contaminant is entrained. If desired, a refractory filter may be employed to remove traces. The magnesium vapor is passed through lines 63 and 64 to a hindered settling condenser 65 which contains cool finely divided magnesium. The magnesium vapors are condensed and solidified either in the form of small particles or on the surface of other particles, and the product magnesium in finely divided fluidized state is drawn off through pipe 66, passed through cooler 67 and withdrawn from the system at 68. A portion of the cool stream is recycled to condenser 65 through pipe 69 for cooling purposes. Additional gas, such as hydrogen, may be introduced to the condenser 65 through pipe 70 if required in order to maintain hindered settling, and gas is removed overhead through pipe 71 where magnesium fines are separated. This method of recovering magnesium allows the dust separation equipment to be operated on a cool gas stream, is continuous in operation, and yields a product which can be passed in fluidized state to storage or to melting retorts.

It will be understood that heat can be recovered from various streams in the process, for example, the carbon monoxide drawn off from the chiller is at a relatively high temperature, and if desired, its heat can be recovered. Furthermore, it is possible to utilize a part of the heat contained in the products of reaction for reheating the chilled material to effect distillation of the magnesium. Other points of heat recovery will be readily observed by those skilled in the art. The method of cooling the heat exchanger 67 of Fig. 2 is of interest. A fluidized stream of an inert solid, for example sand, is circulated through the exchanger and through hindered settler 74 wherein it is fluidized by gas introduced at 75 and taken off at 76, and is cooled by cooling pipes 77. It will be apparent that the fluidized inert solid acts as a safety seal between the magnesium and the coolant, which may be of a reactive nature such as water, flowing through the cooling pipes 77. The danger of explosion here is thereby eliminated. The method can also be used in connection with cooler 8a and heater 17'.

The present process is operated at a relatively low pressure, ordinarily atmospheric pressure or a few pounds above atmospheric, and no great problems arise in this connection. The chiller, the distillation apparatus and the associated pipes can be lined with firebrick or other inert refractories. The reducer is best made with carbon, graphite or silicon carbide because of the high temperature and the reactivity of the magnesia at that temperature.

An important feature of the present invention lies in the relative position of the distillation zone in respect to the chilling and reduction zones. It is preferred to locate the distillation zone at a considerably higher level so that the back pressure resulting from the static head of the fluidized solids in pipe 18 acts to throttle the pressure down to the low value required for distillation in the vacuum, and at the same time, the height of the standpipe 33 is such that sufficient pressure is built up therein to carry the fluidized stream back to the chiller 9 or to the reducing vessel 35.

The process has been described entirely in reference to its application to the manufacture of magnesium, but it will be understood that the process can be readily applied with suitable modifications that will be apparent to those skilled in the art of the manufacture of other metals, especially those mentioned herein above.

I claim:

1. An improved process for manufacturing metals of the right hand side of group 2 of the periodic table whose oxides, hydroxides and carbonates are reducible by carbon, which comprises passing a fluidized stream of the reducible metal-bearing compound and carbon through a high temperature reaction zone wherein a reducing temperature is maintained and the metal product is vaporized, rapidly chilling the affluent vapor product containing the reduced metal and carbon monoxide by the addition thereto of the cool fresh metal-bearing compound and carbon fed to the system, separating the bulk of the carbon monoxide from the chilled material, distilling off the metal and then passing the undistilled mixture of metal-bearing compound and carbon to the reducing zone.

2. Process according to claim 1, in which the solid materials are maintained throughout in a fluidized condition.

3. Process according to claim 1 in which a fluidized stream of the metal-bearing compound and carbon is continuously circulated through a circuit comprising a reducing zone, a chilling zone and a distillation zone and in which the cool fresh metal-bearing material is supplied to the chilling zone continuously and in an amount and at a temperature to reduce the product temperature rapidly and thus prevent reversal of the reaction, and in which the reduced metal is continuously vaporized from the distillation zone.

4. Process according to claim 1 in which the distilling zone is located at a more elevated level than the distillation and reaction zones and at a lower pressure.

5. Process for producing magnesium which comprises continuously passing a mixture of magnesia and carbon through a reduction zone at a temperature of the order of 2200° C. whereby magnesium metal is produced along with carbon monoxide and the former is vaporized and passing the vapors into a chilling zone, continuously passing a mixture of cold magnesia and carbon in a fluidized condition into the chilling zone whereby the temperature is reduced to prevent reversal of the reduction and condense the magnesium vapor, continuously passing a stream of fluidized chilled solids from the chilling zone to a distillation zone and distilling the magnesium from the fluidized solids therein, and then passing this distillation residue consisting of a mixture of carbon and magnesium continuously to the reduction zone.

6. Process according to claim 5 in which the reduction zone is heated electrically.

7. Process according to claim 5 in which a fluidized stream of carbon is partially burned to produce a high temperature, passing a stream of highly heated, fluidized carbon to the reduction zone and feeding cool fluidized magnesia to the chilling zone.

8. Process according to claim 5 in which the distillation zone is located at a level more elevated than the chilling and reduction zones and is operated at a reduced temperature, the difference in elevation being sufficient when suitable adjustment is made in the densities of the fluidized streams to cause circulation of the fluidized streams from the distillation to the chilling zone and from the latter to the reduction zone and thence returning to the chilling zone.

9. Process for producing beryllium which comprises continuously passing a mixture of beryllia and carbon through a reducing zone at a temperature above the boiling point of beryllium whereby the beryllium is produced along with carbon monoxide and the former is vaporized, and passing the vapors into a chilling zone, continuously passing a mixture of cold beryllia and carbon in a fluidized condition into the chilling zone whereby the temperature is reduced to prevent reversal of the reduction and condense the beryllium vapor, continuously passing a stream of fluidized chilled solids from the chilling zone to a distillation zone and distilling the beryllium from the fluidized solids therein and then passing this distillation residue consisting of a mixture of carbon and beryllium continuously to the reduction zone.

JOHN C. MUNDAY.